United States Patent [19]

Acharekar et al.

[11] Patent Number: 4,653,063

[45] Date of Patent: Mar. 24, 1987

[54] LASER APPARATUS

[75] Inventors: Madhu Acharekar, Orlando, Fla.; Carlos Casteleiro, Albuquerque, N. Mex.

[73] Assignee: Litton Systems, Inc., Beverly Hills, Calif.

[21] Appl. No.: 694,998

[22] Filed: Jan. 25, 1985

[51] Int. Cl.⁴ ............................................. H01S 3/08
[52] U.S. Cl. ................................... 372/107; 372/108; 372/65; 372/98
[58] Field of Search .................. 372/107, 108, 61, 65, 372/99, 98; 350/361

[56] References Cited

U.S. PATENT DOCUMENTS

| | | | |
|---|---|---|---|
| 3,562,663 | 2/1971 | Cason, III et al. | 372/107 |
| 3,700,313 | 10/1972 | Karr et al. | 372/107 |
| 3,764,934 | 10/1973 | Schamberger | 372/107 |
| 4,203,080 | 5/1980 | Wright et al. | 372/107 |
| 4,442,524 | 4/1984 | Reeder et al. | 372/107 |

OTHER PUBLICATIONS

Zharikov et al; "Spectral Luminescence, and Lasing Properties of Gadolinium Scandium Gallium Garnet Crystals Activated with Neodymium and Chromium Ions; Sov. Jour. Quant. Elect. 13(1) Jan. 1983.

Primary Examiner—Leon Scott, Jr.
Attorney, Agent, or Firm—William M. Hobby, III

[57] ABSTRACT

A laser apparatus having an optical resonator composed of two end adjustably mounted mirrors positioned at each end of a YAG laser rod. In order to obtain mechanical stability and protection from the environment, concave mirrors having a radius of curvature of less than one meter are each installed in the mount. The mount includes a mirror cell which is preloaded into the mount housing using a generally truncated cone or belville washer shape as a spring. The center of the mirror is gimbaled about a bearing in the mirror cell. Once of the mirror is aligned, it is cemented in position. Thus, the mount combines a short radius of curvature mirror to reduce the sensitivity to optical and mechanical perturbations with a mount to provide mechanical stability in a high-shock environment.

7 Claims, 4 Drawing Figures

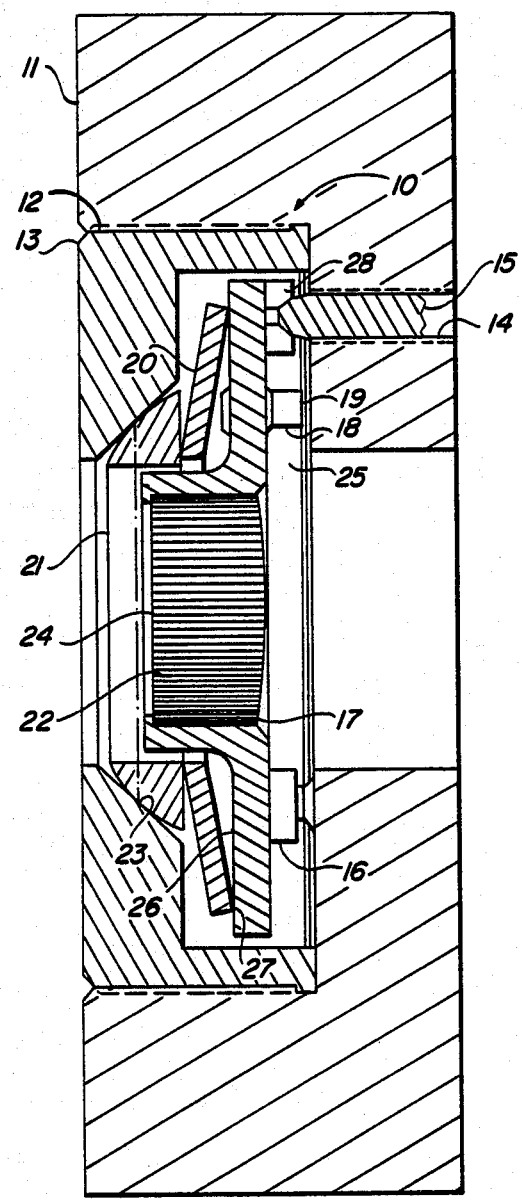
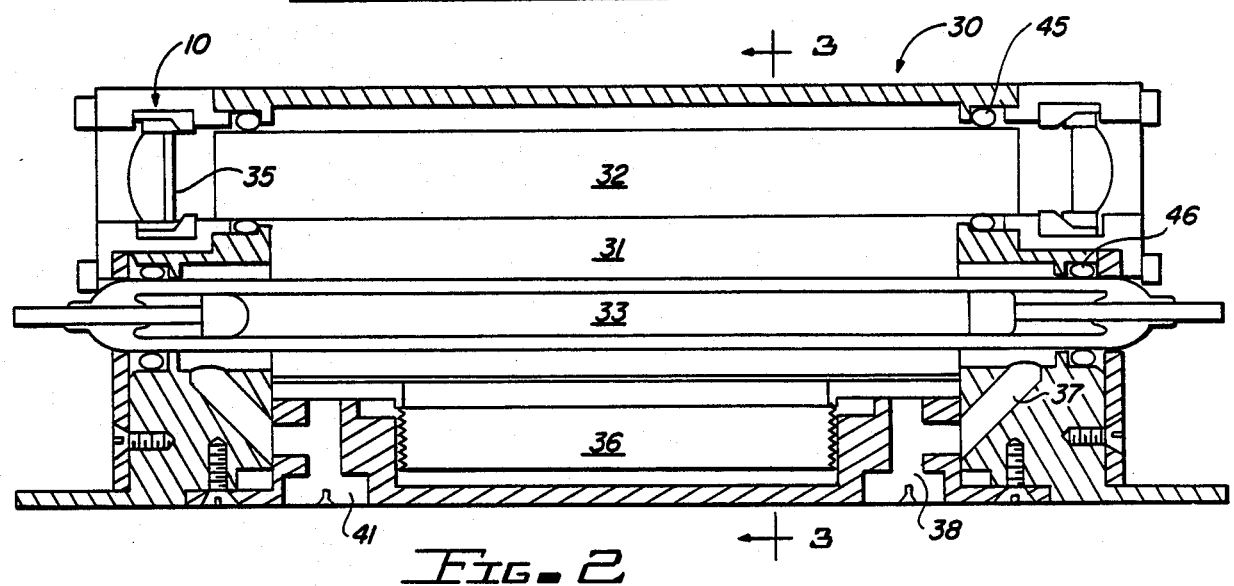

LASER APPARATUS

BACKGROUND OF THE INVENTION

The invention relates to an adjustable mount for mirrors used in a laser resonator, and especially to a laser resonator where weight and size are basic constraints and where great stability of the mirror mount is desireable.

In laser resonators as well as other optical reflecting systems, a reflector or mirror may be mounted for angular adjustment. Various devices have been designed to allow accurate and easy adjustment of the angular position of optical elements for use with lasers. The following U.S. patents are cited as examples of the various types of mirror mounts: U.S. Pat. No. 3,478,608 to V. Met; U.S. Pat. No. 3,601,476 to D. R. MacKenzie; U.S. Pat. No. 3,700,313 to Karr et al.; U.S. Pat. No. 3,836,236 to Kirk et al.; U.S. Pat. No. 3,783,407 to Mefferd et al.; U.S. Pat. No. 3,953,113 to W. A. Shull; and U.S. Pat. No. 4,274,064 to Sepp, et al. In prior U.S. Pat. No. 4,268,799 a curved mirror laser is utilized along with a method of operating the laser.

These prior devices as well as others are designed to solve the problems associated with the assembly of a laser or its operation during changes of temperature of the laser components. However, there are problems associated with lasers used in conditions of high vibration surroundings and the ability of the resonator mount to withstand high acceleration or shock and still retain its alignment. The present invention is designed for use under these conditions.

U.S. Pat. No. 3,924,201 discloses a cross porro resonator which provides a solution to the above-stated problem and hence the approach is briefly described herein. The porro prism acts as a retroreflector which is sensitive to tilt about an axis perpendicular to the roof edge within the limits imposed by total internal reflection. The cross porro resonator requires a polarizer for output coupling. For a stable system the axis of the system must pass through the apex of each prism. The angular alignment tolerance possible with the said resonator can be given by:

$$\theta = \frac{D \sin \phi}{2L} \quad (1)$$

where
D is the laser rod diameter
$\theta$ is angle between porro roof edges and
L is the resonator length.

Thus, for a laser rod of diamater D=0.63 cm and a cross porro prism angle $\phi$=90°, and an angle $\theta$ (for resonator length L=50 cm) of 6.3 mR or 0.36 degrees. An angle of misalignment higher than 0.36 1 degrees degrades the performance of the laser resonator so that the resonator is considered less sensitive to vibration and shock environments and is mechanically stable. However, the cross porro resonator requires a polarizer to extract the output, along with waveplates to adjust the output coupling reflectivity. These components also require stable mounts and this increases the size and weight of the resonator. The laser resonator mirror mounting means of the present invention accomplishes improved mechanical stability in a sample configuration.

SUMMARY OF THE INVENTION

The present invention relates to a laser apparatus having at least two end mirrors, one or both of which are supported by a mirror cell and a solid state lasing medium and mounts for positioning the mirrors in the laser housing. The adjustable mount for the laser resonator mirror achieves mechanical stability by using concave mirrors having a radius of curvature of less than one meter. The adjustable mounts permit tilting of the mirrors for alignment. Once the alignment of the mirrors is complete, the mirror cell is cemented to the housing to provide a laser suitable for high shock or severe vibration environments. The mirror or reflector in the laser has at least a partial reflectivity for the wavelength of laser operation and have means to hold and seal the mirror to a mirror cell. The mirror cell is preloaded or prebiased with a spring, shaped generally like a truncated cone or belville washer with a hollow center. A retainer compresses the spring while the mirror cell is supported by gimballed bearings and is adjusted against the spring compression by a plurality of adjustment screws for adjusting the mirror cell. This laser apparatus anticipates a solid-state laser medium which includes Nd:YAG and Nd:CR:GSGG. The mirror may have a passive Q switch component attached thereto and has a radius of curvature equal to approximately 25 centimeters placed at the end of an approximately 5 centimeter long laser rod to produce a highly divergent laser beam.

A method of making a laser in accordance with the present invention having mirrors and a mirror cell mounted in a mirror cell mount includes the steps of selecting a pair of concave end mirrors having a radius of curvature of less than one meter and mounting one of the mirrors at each end of a solid state laser rod in a mirror mount, and aligning the mirrors in their respective mounts to obtain a lasing action. The method also includes providing laser action in the solid state laser with the laser mounts and then cementing each mirror to the housing of the mirror mount in an aligned position.

BRIEF DESCRIPTION OF THE DRAWINGS

Other objects, features and advantages of the present invention will be apparent from the written description and the drawings in which:

FIG. 1 is a sectional view of a mirror mount in accordance with the present invention.

FIG. 2 is a sectional view of a laser having the mirror mount of FIG. 1.

DESCRIPTION OF THE PREFERRED EMBODIMENTS

Figure 3:
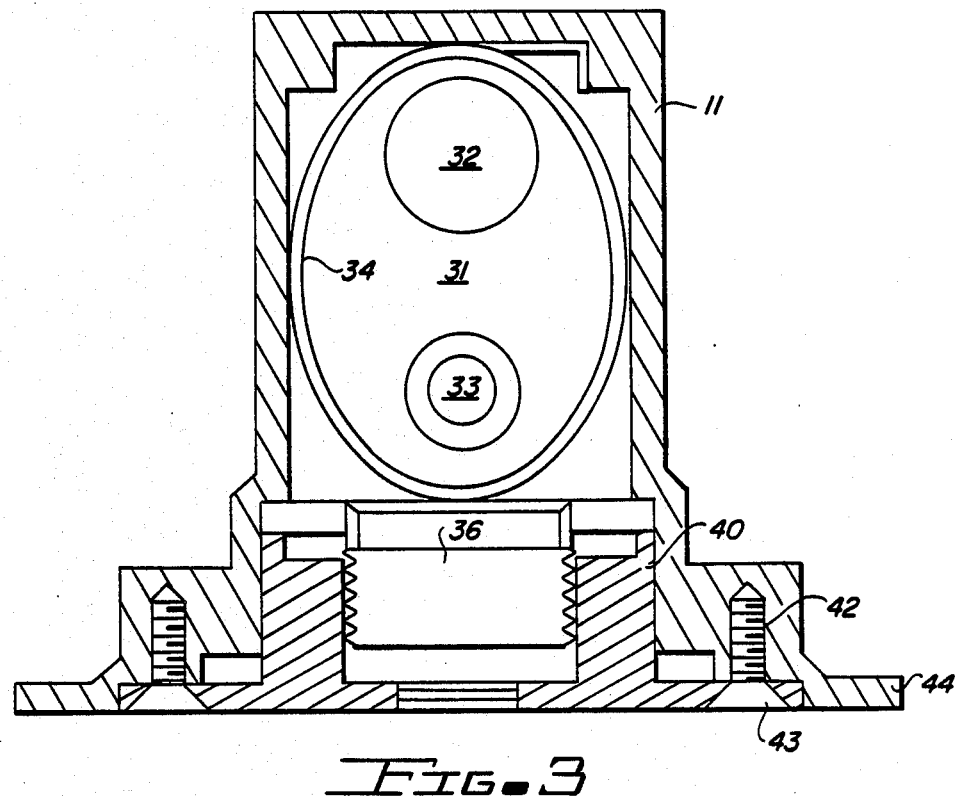
FIG. 3 is a sectional view taken on a line 3—3 of FIG. 2.

Referring to FIG. 1 of the drawings, there is shown an adjustable mirror mount 10 having a housing 11. The housing 11 may be made of an aluminum alloy or the like and has a threaded bore 12 to mate with the retainer 13. The housing 11 has three bores 14 for adjustment screws 15. The adjustment screws 15 are coupled into bearing pads 16 which bearing pads may be made of a heat treated ferro-tic material or the like. The surfaces of the pads 16 which seat on lens cell 17 are lapped flat.

The lens cell 17 may be made of industrial hard chrome plated invar or other metal, as desired. The lens cell 17 has two orthogonal slots that fit about the locating ball studs 18 which prevents rotation and axial motion of the lens cell but allows the cell the freedom to be gimbaled thereon. These locating ball studs 18 may be made of polished stainless steel. The housing 11 has threaded bores 19 for attaching ball studs 18. Trapped between the lens cell 17 and the retainer 13 is a belville washer (or truncated cone) shaped spring 20 and a bearing 21. The upper and lower edges of the stainless steel spring 20 are ground parallel to each other to a width of 0.012 to 0.020 inches to lay flat against compressing surfaces so that it smoothly slides over the lens cell 17. A belville washer is a truncated cone-shaped washer having an opening in the middle, but is here used as a spring or biasing member and is specially made of stainless steel of predetermined thickness and having polished, flattened edges 27 for fitting flat on the mirror cell surface 26. Initially, the belville washer shaped spring 20 is prebiased or preloaded using the three adjustment screws 15 to produce a force, such as 140 psi of compression. This resonant mirror 22 is mounted in the lens cell 17 and aligned using the adjustment screws 15 for rotating or tilting the lens cell on the center of the mirror gimbals 18 about the bearing 21 and the lens cell interface member 23. Once the alignment of the mirrors 24 is completed, the mount is cemented to the housing 11 with an adhesive 25 to lock it in position, so that the mount provides the basic requirement of aligning two mirrors 24 with an independent orthogonal and backlash-free tilt.

A laser apparatus 30 embodying the invention of FIG. 1 is shown in FIGS. 2 and 3 and has a pump cavity 31 having a laser rod 32 therein along with a flash lamp 33, silvered cavity walls 34 for reflecting and focusing the energy from the flash lamp 33 to the rod 32, is more clearly shown in FIG. 3. The laser has the housing 11 supporting the laser cavity 31 therein having the mirror mount 10 on each end thereof. The mirror mount 10 may have a passive Q switch 35 which may be a bisnickel dye pockle cell Q switch having a cellulose acetate substrate. A slight curvature of the mirror face 24 is not noticeable in the drawings. The laser housing 11 has pairs of O ring seals 45 supporting the rod 32 and sealing the housing while the flash lamp 33 has O ring seals 46 for sealing the cavity 31 which may be filled with a liquid coolant. The cavity 31 may be connected through a pair of passageways 37 on either end of the laser housing to passageways 38 and 41 which are in turn connected to a bellows reservoir 36. The bellows reservoir 36 allows for the expansion as the coolant is heated and thus allows the complete cavity 31 to remain filled with an expanding and contracting liquid which allows better cooling by virtue of the larger amount of liquid coolant and by the larger surface area provided by the bellows, and the passageways in addition to the cavity. Advantageously, the passageways 38 and 41 can be opened by the removal of a cap from the bottom thereof for connecting coolant lines for directing coolant fluid through the laser during testing of the laser. The tube can then be removed and the sealing caps put on and sealed for the final mounting of the laser. The laser housing 11 also includes walls 48 attached therein to form passageways 38 and 41 along with threaded screws 42 countersunk at 43 for attaching the laser housing to an apparatus in which the laser is to be used. Flanges 44 provide a mounting surface for supporting the laser.

Figure 4:
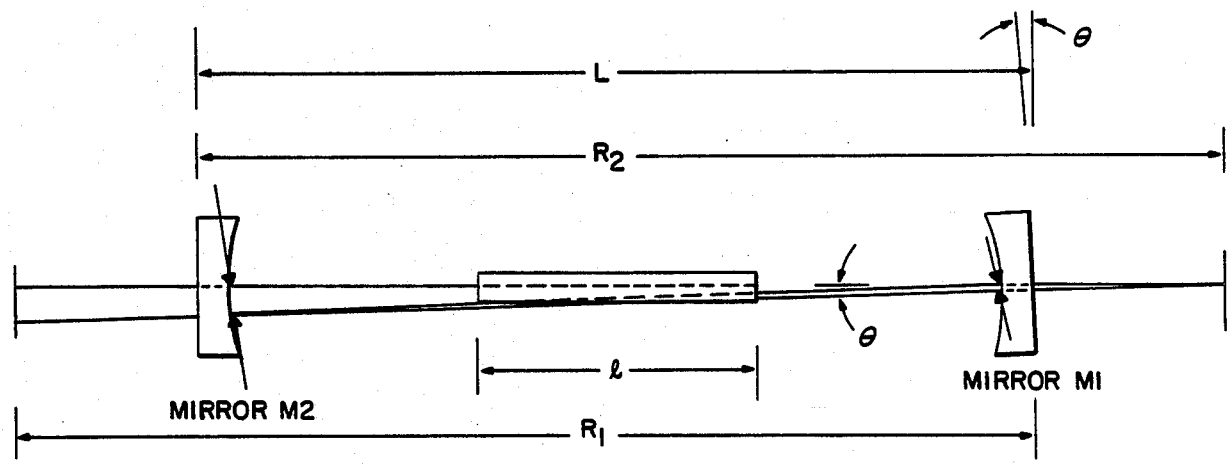
FIG. 4 is an optical schematic of the laser resonator components on an exaggerated scale to show the underlying principals of angular alignment tolerance.

The angular alignment tolerance for the laser in FIGS. 1–3 can be derived using the optical schematics in FIG. 4. As shown in the FIG. 4, the laser output is taken via a partially transmitting mirror whose transmission is in the range of 50% to 80%. The optical axis of the system must be normal to both mirrors and pass through the centers of curvatures of the mirrors. If one mirror is tilted, laser action will cease altogether when the optical axis coincides with the edge of the aperture of the laser rod.

Considering a resonator of mirror radii $R_1$ and $R_2$ and separation L, a rotation of Mirror $M_1$ through an angle $\theta$ rotates the line joining the centers of curvatures of two mirrors through an angle $\phi$ and causes a linear displacement X and Y:

$$X = \frac{R_1(R_2 - L)\theta}{R_1 + R_2 - L} \tag{2}$$

and $$\tau = \frac{R_1 R_2 \theta}{R_1 + R_2 - L} \tag{3}$$

For the resonator with $R = R = R$ and $R >> L$ previous equations can be rewritten as:

$$X = \tau = \frac{R\theta}{2} \tag{4}$$

If displacement $X = Y$ is designated as $\Delta$, then equation (4) takes a familiar form:

$$\theta = \frac{2\Delta}{R} \tag{5}$$

The laser action will cease when the displacement $\Delta$ is equal to the radius of the laser rod. Now, equation (5) can be rewritten as:

$$\theta = \frac{2D/2}{R} = \frac{D}{R} \tag{6}$$

For a laser rod diameter $D = 0.63$ cm and the radius of a mirror $R = 1$ meter, there is an angular angular alignment tolerance of $\theta = 6.3$ mR or 0.36 degrees. Thus, it is clear that the resonator provides the stability equivalent to a cross porro prism resonator.

The angular alignment tolerance can be increased by decreasing the radius of curvature of the resonator mirrors, however, as the radius of curvature is decreased, the mode radius decreases and the laser beam divergence increases. Where a laser with the mode radius or divergence angle are not important, a mirror having a radius of curvature of less than 1 meter can be used in the resonator configuration.

It should be clear at this point that a laser apparatus has been provided with a special mirror mount which can have a mirror cell and mirror mounted therein having a slight curvature to the surface of the mirror and which may be aligned and locked in position for stability in high-shock environments or under conditions of high vibrations. It should, however, also be clear that the present invention is not to be considered as limited to the forms shown which are to be considered illustrative rather than restrictive.

I claim:

1. A laser resonator comprising:

a solid state lasing medium;

mirror mount including a mirror cell for holding a mirror;

two end mirrors, at least one of said mirrors having at least partial reflectivity and supported by said mirror mount;

means to hold said one mirror to the mirror cell;

means to mechanically bias the mirror cell to withstand high gravational forces including a single spring under spring pressure, said spring having a substantially truncated cone shape;

retainer means for compressing said spring;

at least one support bearing gimbaled to support the mirror cell; and a plurality of adjustment screws for adjusting the mirror cell.

2. A laser resonator in accordance with claim 1, including means to seal one said mirror to the mirror cell.

3. A laser resonator in accordance with claim 1 in which the laser resonator solid state lasing medium includes Nd:YAG and Nd:CR:GSGG.

4. A laser resonator in accordance with claim 1 including a passive Q-switch mounted to one said mirror.

5. A laser resonator in accordance with claim 4 in which the radius of curvature of one said mirror is less than one meter.

6. A laser resonator in accordance with claim 5 in which the radius of curvature of one said mirror is approximately 25-cm placed at the end of an approximately 5-cm long solid state lasing medium to produce a bright divergent laser beam.

7. A method of making a laser having a pair of mirrors with one mirror mounted in a mirror mount having a mirror mount housing comprising the steps of:

selecting a pair of concave end mirrors having a radius of curvature of less than one meter;

mounting one of said mirrors at each end of a solid-state laser rod in a mirror mount having a mirror mount housing;

mechanically biasing one of said mirror mount housings with a generally truncated cone spring to thereby withstand high gravational forces and support the mirror housing under a spring pressure of a single spring;

pumping said laser rod;

aligning said mirrors in their respective mirror mounts to obtain lasing action from the solid-state laser rod; and cementing each aligned mirror to the housing of the mirror mount whereby a laser apparatus is produced having mechanical stability.

* * * * *